United States Patent [19]

Flauiani

[11] Patent Number: 4,542,760
[45] Date of Patent: Sep. 24, 1985

[54] EARTHQUAKE RESPONSIVE DEVICE FOR AUTOMATICALLY SHUTTING OFF GAS OR WATER OR ELECTRICITY OR THE LIKE

[76] Inventor: Edmond Flauiani, 433 40th Ave., San Francisco, Calif. 94121

[21] Appl. No.: 537,169

[22] Filed: Sep. 29, 1983

[51] Int. Cl.⁴ ............................................. F16K 17/36
[52] U.S. Cl. ...................................... 137/45; 251/74; 251/313
[58] Field of Search ................. 137/38, 39, 45; 74/2; 251/66, 74, 313

[56] References Cited

U.S. PATENT DOCUMENTS

| | | | |
|---|---|---|---|
| 1,521,150 | 12/1924 | Colonna | 251/74 X |
| 3,791,396 | 2/1974 | Nelson | 137/38 |
| 4,161,183 | 7/1979 | Berry | 137/39 |
| 4,429,704 | 2/1984 | Jones | 251/66 X |

FOREIGN PATENT DOCUMENTS

| | | | |
|---|---|---|---|
| 351794 | 3/1921 | Fed. Rep. of Germany | 251/74 |
| 36634 | 3/1980 | Japan | 137/45 |
| 72968 | 6/1980 | Japan | 137/38 |
| 155973 | 12/1980 | Japan | 137/38 |
| 42773 | 3/1981 | Japan | 137/38 |

Primary Examiner—Robert G. Nilson
Attorney, Agent, or Firm—Owen, Wickersham & Erickson

[57] ABSTRACT

The invention contemplates the shutting down of such fields of endeavor which otherwise would likely be injurious to life or property on occasions of earthquakes and the like, and comprises a system wherein disuse in the said fields of endeavor occurs automatically upon the major vibration of one or more essential parts or components of a device causing the said components or parts to be disengaged from the remainder of the system and the shut-off operation thereof. As will appear from the disclosure hereinafter set forth in this application of a light duty and a heavy duty embodiment of the device, the systems set forth rely upon a spring loaded wheel which has a specially shaped under-section so to engage a valve or the like in the supply line of the field of endeavor, and being a part of a system which is very sensitive to vibration, and through slippage the parts of the system are released and the valve is shut off. The system, it is clear, is applicable to numerous fields of use.

12 Claims, 11 Drawing Figures

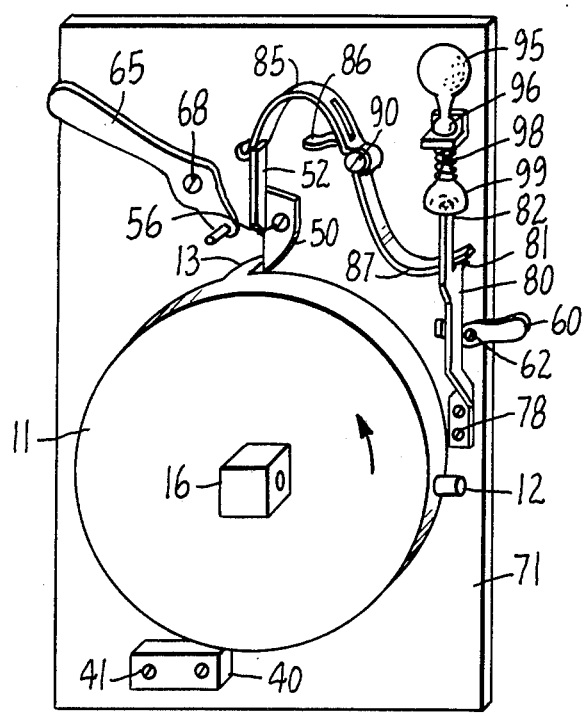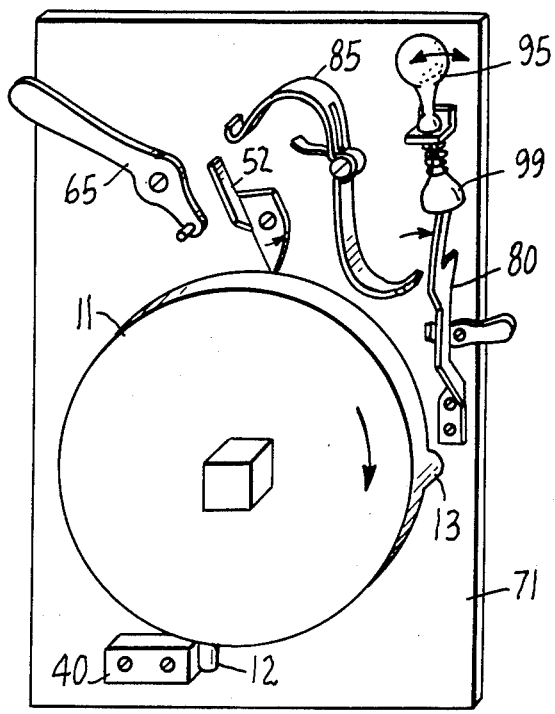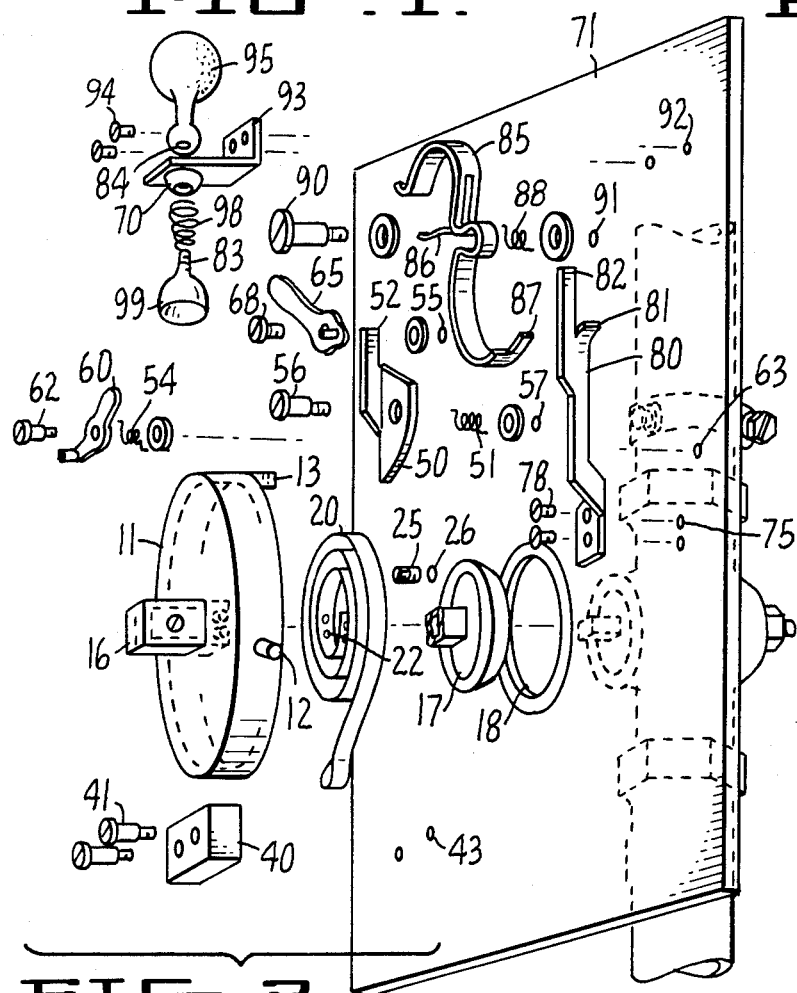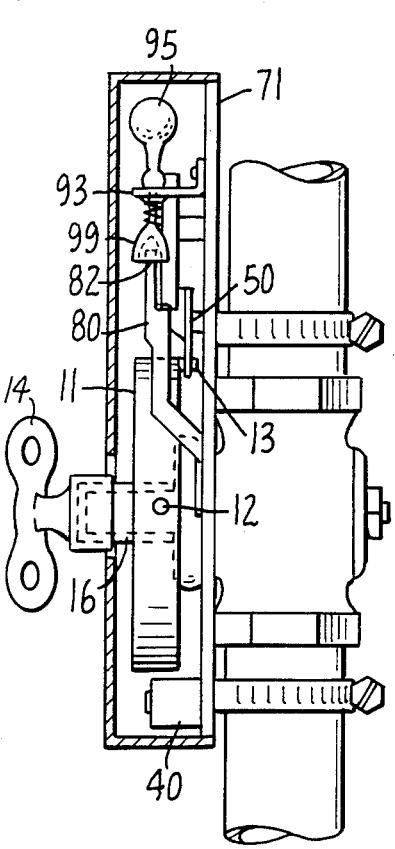

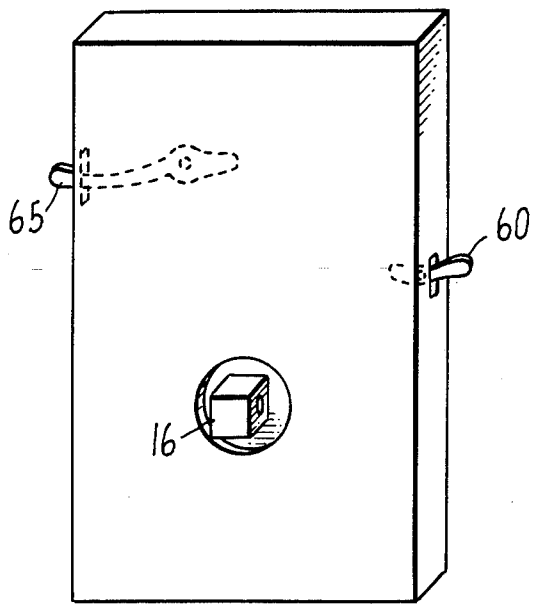
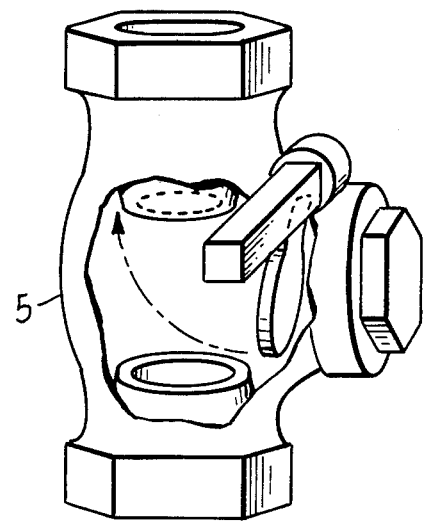
FIG. 5.   FIG. 6.
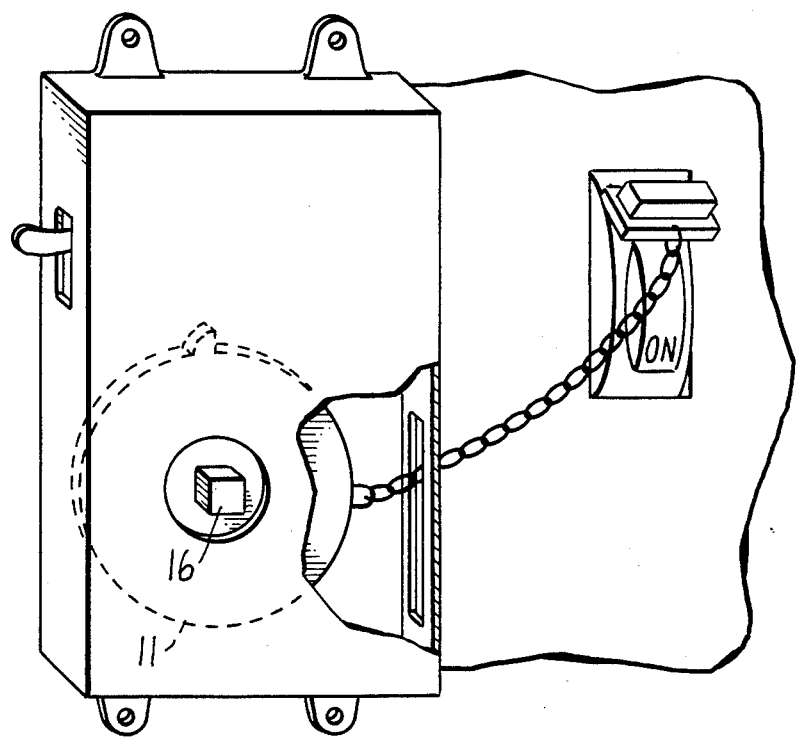
FIG. 7.

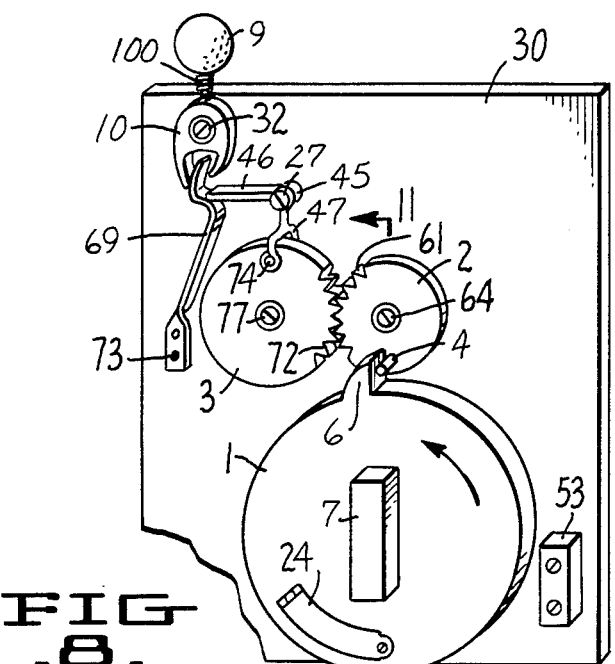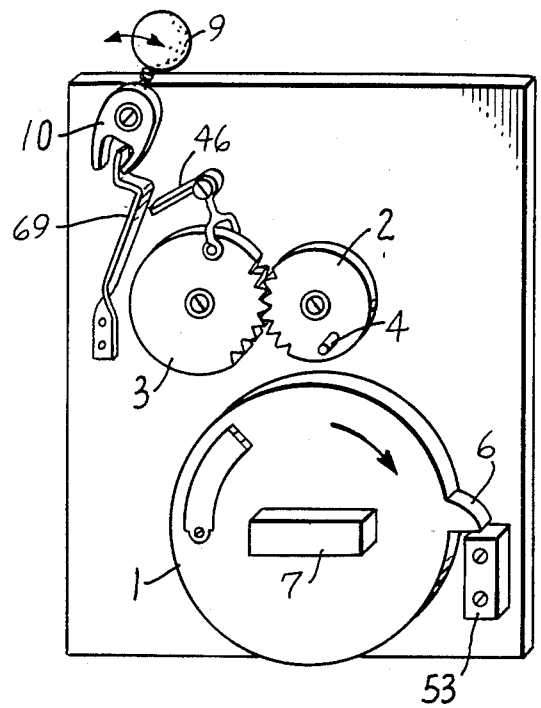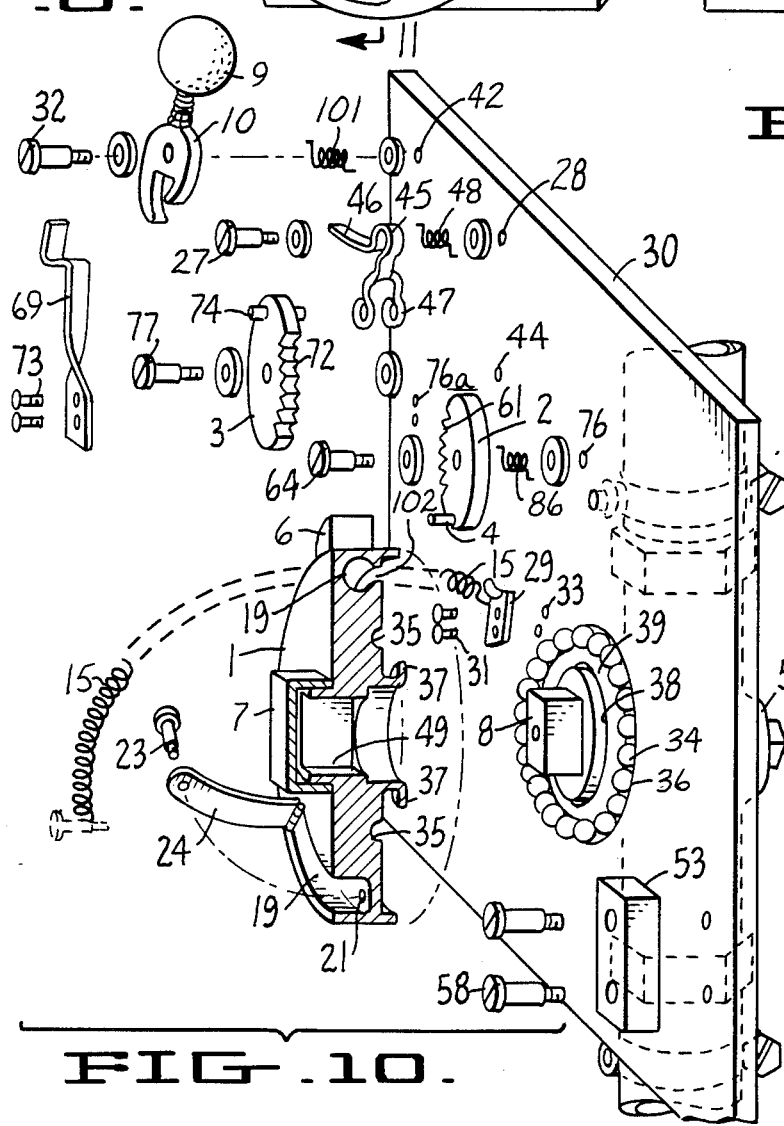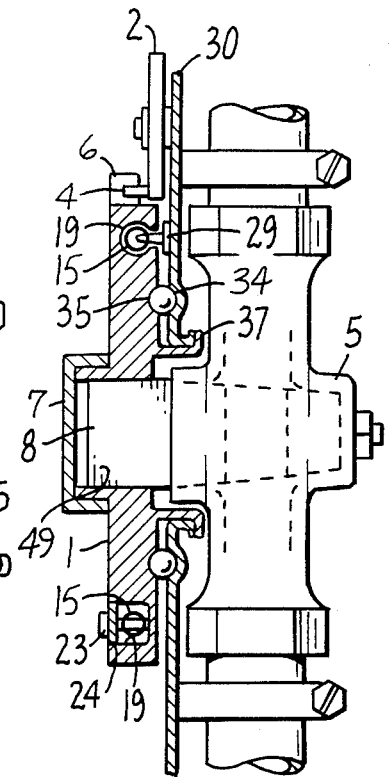

4,542,760

EARTHQUAKE RESPONSIVE DEVICE FOR AUTOMATICALLY SHUTTING OFF GAS OR WATER OR ELECTRICITY OR THE LIKE

A primary object of the invention is to provide a new and useful device which causes the disuse or shut off of a utility supply line upon the vibration of a part or parts thereof.

Another object of the invention is to provide a new and useful device which is readily adaptable and applicable to existing utility systems.

Another object of the invention is to provide a new and useful of the aforementioned character which can be produced at a minimum of cost.

Other objects of the invention, together with some of the advantageous features thereof, will appear from the following description of a preferred embodiment of the invention which is shown in the accompanying drawings. It is to be understood that the appended claims are intended to cover the embodiments illustrated as well as variations thereof within the scope and perview of the invention as disclosed herein.

Referring to the drawings:

FIG. 1 is an elevational view of a light duty device in an open or loaded position ready for operation.

FIG. 2 is a view similar to FIG. 1 but is in a utility line shut-off or broken position.

FIG. 3 is an elevational exploded view of the various components of the light duty device.

FIG. 4 is still another elevational view of the light duty device.

FIG. 5 is an elevational view of the light duty device in a closed position within a case.

FIG. 6 is an elevational view of an altered water valve with a long stem added for device engagement.

FIG. 7 is a pictorial view of the device engaging electrical fuse panel and engaging main fuse switch.

FIG. 8 is an elevational view of a heavy duty device in a open or operative position.

FIG. 9 is an elevational view of the heavy duty device in broken or inoperative position having completed shut-off.

FIG. 10 is an exploded side view of the heavy duty components of the heavy duty device.

FIG. 11 is a sectional view of the components of the heavy duty device in an open or operative position.

The light duty and the heavy duty devices are so designed, as illustrated in the drawings, so that either device can be easily and readily installed in any existing utility line without major alteration thereto, and can also be easily and readily incorporated as an integral part of various types of valves or switches and thus be installed directly as a unit at the time of the installation of utility lines and the like. Also, the elements of the device that engages gas or electrical lines, can be heat sensitive so as to shut off those lines in the case of fire.

In its preferred form, a light duty device of the present system preferably comprises a back plate having a circular opening in its lower section in which a flared out lower end of a center stem of a recessed wheel is engaged and which is free to rotate in either direction, a sprig in the recess of said wheel, a wheel center stem which protrudes outwardly from the wheel surface; the lower end of said center stem being hollow and specially shaped so as to engage and be a housing for different types of valve stems or switches, a pin extending from the periphery of said wheel, together with an extension on the periphery of said wheel; said wheel being adapted to move in a clockwise direction in response to the movement of said spring; movement of said wheel counterclockwise causing movement of a nut mounted on said back plate that in turn moves a two part flange and an anchor set in the said back plate and adaptable to be freely vibrated with respect thereto; an oscillator freely set in the said back plate that is free to undulate in all directions, the movement of the said oscillator causing vibration of the said anchor, causing the slippage of said flange and the breaking of said flange free from said nut, thus allowing clockwise rotation of the said wheel and to cause the said pin to come to rest below the said wheel in a system broken condition.

As clearly depicted in FIGS. 1 and 3, the light duty device comprises a wheel 11 provided with a pin 12 on its periphery and housing a spring 20 of which spring one end is secured at 22 to inner stem 16 of the said wheel and the other end of the said spring is secured by means of a perforation 26 and screw 25 to the back plate 71, thus holding the spring 20 within the recess of the said wheel under moderate tension. The back plate 71 has a through opening 18 through which the stem 16 is connected to a utility shut-off valve 17. On the periphery of the said wheel, extending downwardly is a wedge 13 which, when the said wheel 11 is moved counterclockwise, engages and pushes the lower end of a cammed latch 50 causing the said lower end to move in a clockwise direction about a pivot pin 56 which is secured in an opening 57 of the plate 71, although the latch 50 is normally urged counterclockwise by a spring 51 (see FIG. 3). The wedge 13 can be latched to the latch 50 manually, using a handle 14 (FIG. 4), and the upper end 52 of the latch 50 engages the top portion of extension 86 of flange 85 to cause flange 85 to move in a counterclockwise direction, while the upwward movement of the lower end 87 of the said flange 85 moves against the inner side of anchor 80, which is secured by screws 78 in plate openings 75, causing anchor 80 to bend slightly outward until the lower end 87 of the said flange 85 reaches anchor slot 81 and escapes upward; anchor 80 freed from pressure by lower end 87 of flange 85 returns to its centered position, thus blocking flange 85 from returning clockwise to its centered position, although normally a spring 88 urges the flanges 86 clockwise. The flange 85 is held by a pivot pin 90 that passes through the spring 88 and is secured to the plate 71 in an opening 91. Simultaneously, as lower end 87 of flange 85 moves above anchor slot 81, wedge 13 on wheel 11 in its counterclockwise movement has cleared and thus released nut 50 to return in a counterclockwise motion to its centered position but its movement is blocked by the upper end of flange 85 which has its lower end 87 trapped by anchor 80. The manual counterclockwise movement of wheel 11 with its wedge 13 past nut 50 has effected a considerable spring 20 pressure, thus wheel 11 is allowed to return in a clockwise direction with its wedge 13 trapped on the left side of nut 50 and the device is loaded and the valve is open.

The device includes an oscillator 95 which is made of heavy substance, such as lead, and a stem integrated therewith, a small ball 96 which rests on top of an L-shaped bracket 93 having a concave bowl shaped part 70 having an opening in its center where ball 96 rests and is free to undulate in all directions. Also the bowl shaped part 70 has an opening in its center through which the bell shaped striker 99 is connected with its stem 83 to a receptacle in small ball 84 and thus oscillator 95 and striker 99 become one rigid part.

The nature of opening 70 is such that it will not allow ball 96 to come through but it is large enough to allow for a degree of free oscillation in all directions by the oscillator striker 95.

To hold the oscillator 95 to a centered position a cone shaped soft spring 98 is placed between the bottom of bracket 93 and the top of striker bell 99. The bracket 93 unit is secured to plate 71 through perforation 92 and by screws 94.

The oscillator striker 95 is positioned directly above anchor 80 and the upper tip 82 of anchor 80 resting suspended centered inside striker bell 99. The device commences its functional operation when the oscillator 95 responding to external motion, starts to sway back and forth—thus transmitting its motion to striker bell 99 and it will repeatedly strike anchor tip 82 causing anchor 80 to vibrate and through slippage the lower end 87 of flange 85 escapes anchor slot 81, and flange 85 is free to move clockwise allowing nut 50 to move counterclockwise which releases wedge 13 thus allowing wheel 11 to rotate clockwise with the pin 12 to come to rest on a stop element 40 which is fixedly secured to plate 71 by means of perforation 43 and bolt 41 as shown. The device is now unloaded and its operation completed and the utility system is shut-off or service broken off.

To manually unload the device, or place it in a non-operating condition, a lever 60 is pivotally secured to plate 71 through perforation 63 and bolt 62. This lever is spring controlled by spring 54 so to rest in a centered position. To secure the device in a loaded or operational position a lever 65 is secured to back plate 71 through perforation 55 and bolt 68.

The heavy duty embodiment of said device comprises as shown in FIGS. 8-11, a back plate 30, which has a round opening 38 in its lower center; surrounding said opening 38 in plate 30 and spaced from it by an annular area 39 is a concave channel 36 for housing ball bearings 34. Attached to the back side of said plate 30 may be brackets for the easy installment of the device to the main valve 5 of a utility pipe line system and the like as shown FIG. 11. The valve 5 is also shown in FIG. 6. The back side or underside of opening 38 in plate 30 is especially shaped to hold engaged but allow free-rotation of recessed wheel 1 which is provided on its periphery with a wedge 6, a ball bearing housing 35, an outwardly extending center stem 7, with said stem having a especially shaped hollow underpart shaped so as to receive and engage valve stem 8 and the like, an under protruding skirt 37 especially shaped so as to be engaged in and freely rotate within opening 38 of back plate 30; a spring 15, confined within spring housing 19 of wheel 1, in which it is inserted through an opening 102 a spring access cover 24 and a perforation 21 and bolt 23 to secure the cover 24 to back plate 30 and to secure one end of spring 15, the other end of said spring 15 is secured to bracket 29 that is secured to back plate 30 by means of perforation 33 and bolt 31. Also provided in the heavy duty device is a wheel 2 which is partially geared as at 61 and having a pin 4 protruding outwardly therefrom, a stabilizing spring 86; and said wheel 2 being secured to back plate 30 by means of bolt 64 and perforation 76. Likewise, wheel 3 is also partially geared and has a pin 74 that protrudes from both sides thereof; said wheel 3 is also secured to back plate 30 by means of a bolt 77 and perforation 44. A two part flange 45, somewhat similar to the light duty version of the device, has one elongated end 46 and the lower or other end divided into two loops 47, a stablizing spring 48; the flange 45 being secured to back plate 30 by means of bolt 27 and perforation 28.

The anchor 69 of the device is specially shaped as shown in FIG. 10 and secured to the back plate 30 by bolt 73 and perforation 76a in such a manner as to allow the said anchor to freely vibrate, as is the case in the light duty version. The oscillator 9 is made of a heavy substance, like the light duty version, such as lead, with spring 100 it is connected to striker 10 and is retained in its upright position by means of a stabilizing spring 101, and is secured to back plate 30 by means of a bolt 32 and perforation 42.

When the device engages a valve, as shown in FIG. 10 and FIG. 11, and in this case being a common main gas valve 5, the valve should be in a closed mode or, a valve center stem 8 should be in a horizontal position as the stem 7 is shown in FIG. 9, the engaging device should also be in a closed position. Now valve center stem 8 is engaged with wheel 1 hollow center stem 49, as shown particularly in FIG. 11. Manually, with the help of a common wrench that engages the outward extending center stem 43 of wheel 1 against the pressure of the spring 15, wheel 1 is turned counterclockwise, and through wedge 6 moves pin 4 and thus wheel 2 in a clockwise direction. Simultaneously, wheel 3 being in constant contact with wheel 2 by means of their respective gears 61 and 72 wheel 3 is made to move counterclockwise; thus pin 74 has forced flange end 46 to rise upward against inner side of anchor 69 pushing anchor 69 slightly outward until said flange end 46 reaches the top portion of anchor 69 and escapes upward, thus freeing anchor 69 from flange end 46 pressure, and it returns to its centralised position. Simultaneously, wedge 6 of wheel 1 in its counterclockwise movement has disengaged pin 4 and by virtue of its centralizing spring 66, wheel 2 free from wedge 6 pressure in a counterclockwise direction returns to its centralized position and wheel 3 is forced to move clockwise and flange end 46 comes to rest on top curved portion of anchor 69 and it is trapped by it. Wheel 1 is slowly allowed to return clockwise till wedge 6 comes to rest on the left side of pin 4.

Now all of the pressure of the spring 15 is bearing down through wedge 6 upon pin 4, but it is prevented from moving because wheel 2 is trapped by wheel 3 and wheel 3 is trapped by flange 45 which is in turn trapped by anchor 69. The device is now in a loaded position with the valve of the utility line where it is being used in an open position, as particularly shown in FIG. 8 and FIG. 11 of the drawings.

To unload or release the device, such as the light duty version, it can be done manually by a lever, or by a sharp jolt or a continuous swaying motion that would cause the oscillator 9 to sway back and forth causing its lower end or striker 10 to repeatedly strike the upper top of anchor 69 and causing it to vibrate, and through slippage flange end 46 escapes the anchor hold, thus allowing wheel 3 and wheel 2 to freely rotate, wedge 6 pushes pin 4 to the right and with the pull of spring 15 wheel 1 is forced to rotate clockwise till wedge 6 encounters stop 53 and stops. The stop 53 is secured to the plate 30 by screws 58. The device is unloaded and the valve in the utility line has been shut off.

The preceding specification and the accompanying drawings set forth and disclose the preferred embodiment of my invention and the best mode and manner of construction of the same. However, it is understood that the illustrated device can be constructed in a plurality and variety of ways, all within the scope and purview of my claimed invention. For example, the device may be adapted to turn off an electrical switch, as shown in FIG. 7.

I claim:

1. An earthquake-responsive shut-off device for a controlling shut-off valve having a valve-controlling rotary stem, comprising:

a rotary wheel having a hub portion for direct engagement with a said stem for rotation thereof and having a projecting member extending out from its periphery, a support plate having an opening through which said hub portion can be engaged with a said stem, spring means with one end secured to said plate and the other end secured to said wheel for building up force upon rotation of said wheel in one rotary direction to a latching position and releasing said force upon release from the latching portion, thereby rotating said wheel in the opposite direction, first latching means rotatably secured to said plate at a first axis and having a latch on one side of said axis for latching by engagement with said projecting member upon manual rotation of said wheel in said one direction to said latching position, second latching means rotatably secured to said plate at a second axis and having first and second arms, said first arm being engaged and rotated by said first latching means when said projecting member engages and is latched by said latch, a latch arm having a base secured in a stationary position to said plate adjacent to said second latching means and having a latch portion engaged by said second arm when said second latching means is engaged and rotated by said first latching means, so that said second arm is then latched to said latch portion, and vibration-responsive latch release means for releasing said second arm from said latch portion when there is significant vibration, such as by an earthquake, so that said first arm then acts to release said first latching means, whereupon said spring means then rotates said wheel in said opposite direction.

2. The device of claim 1 having stationary means secured to said plate and cooperating stop means on said wheel for limiting rotation of said wheel in said opposite direction.

3. The device of claim 1 having manually set means for retaining said projecting member in its latched position regardless of vibration.

4. The device of claim 1 having manually actuated means for releasing said projecting member from its latched position in the absence of vibration.

5. An earthquake-responsive shut-off device for a controlling shut-off valve having a valve-controlling rotary stem, comprising:

a rotary wheel having a hub portion for direct engagement with a said stem for rotation thereof and having a projecting member extending out from its periphery, a support plate having an opening through which said hub portion can be engaged with a said stem, spring means with one end secured to said plate and the other end secured to said wheel for building up force upon rotation of said wheel in one rotary direction to a latching position and releasing said force upon release from the latching portion, thereby rotating said wheel in the opposite direction, first latching means rotatably secured to said plate at a first axis and having a latch on one side of said axis for latching by engagement with said projecting member upon manual rotation of said wheel in said one direction to said latching position, and a first arm on the opposite side of said axis, second latching means rotatably secured to said plate at a second axis and having second and third arms on opposite sides of said second axis, said second arm being engaged and rotated by said first arm when said projecting member engages and is latched by said latch, a latch arm having a base secured in a stationary position to said plate adjacent to said second latching means and having a distal latch portion engaged by said third arm when said second latching means is engaged and rotated by said first arm, so that said third arm is then latched to said latch portion, and vibration-responsive latch release means for releasing said third arm from said latch portion when there is significant vibration, such as by an earthquake, so that said second arm then releases said first latching means, whereupon said spring means then rotates a said wheel in said opposite direction.

6. The device of claim 5 wherein said projecting member projects out from said wheel in an axial direction, said first latching means having a latching radial edge and a cammed curved opposite edge for facilitating latching.

7. The device of claim 5 wherein said second latching means has a first portion of said second arm bent out from a second portion thereof, said first portion being engaged by said first arm only during the latching operation and said second portion thereupon being engaged to maintain said latching.

8. The device of claim 5 having a lever pivoted to said plate and engageable with said first arm for manually maintaining its latched position in spite of vibration.

9. The device of claim 5 having a lever pivoted to said plate for manually engaging said latch arm and releasing said third arm from said latch portion, whenever desired.

10. The device of claim 5 wherein said vibration-responsive latch release means comprises a weighted oscillator joined to a bell-shaped striker via a ball resting on a bowl-shaped member that is secured to said plate, said striker having a portion surrounding an uppermost end of said latch arm.

11. An earthquake-responsive shut-off device for a controlling shut-off valve having a valve-controlling rotary stem, comprising:

a rotary wheel having a hub portion for direct engagement with a said stem for rotation thereof and having a projecting member extending out from its periphery, a support plate having an opening through which said hub portion can be engaged with a said stem, spring means with one end secured to said plate and the other end secured to said wheel for building up force upon rotation of said wheel in one rotary direction to a latching position and releasing said force upon release from the latching portion, thereby rotating said wheel in the opposite direction, a second wheel rotatably mounted on said plate and having a latch adjacent to its periphery for latching by engagement with said projecting member upon rotation of said main wheel in said one direction, and also having a toothed peripheral portion, a third wheel rotatably mounted on said plate and having a toothed peripheral portion in engagement with the toothed peripheral portion of said second wheel, auxiliary latching means rotatably secured to said plate and having first and second arms angularly related to each other, said first arm being rotatably secured to said third wheel near the periphery thereof, a latch arm having a base secured in a stationary position to said plate adjacent to said auxiliary latching means and having a latch portion engaged by said second arm when said auxiliary latching means is moved by said third wheel upon latching of said first wheel's projecting member to said latch on said second wheel, so that said second arm is then latched to said latch portion, and vibration-responsive latch release means for releasing said second arm from said latch portion when there is significant vibration, such as by an earthquake, with resultant movement of said first arm so that said second and third wheels rotate and then release said latch, whereupon said wheel is rotated in said opposite direction by said spring means.

12. The device of claim 11 wherein said vibration-responsive latch-release means comprises a weighed ball supported on a shank connected to a striker and being freely movable from side to side upon occurrence of substantial vibration, said striker comprising a bifurcated member with a branch on each side of the upper end of said latch arm and engaged with it when vibrated.

* * * * *

UNITED STATES PATENT AND TRADEMARK OFFICE
CERTIFICATE OF CORRECTION

PATENT NO. : 4,542,760

DATED : September 24, 1985

INVENTOR(S) : Edmond Flaviani

It is certified that error appears in the above-identified patent and that said Letters Patent are hereby corrected as shown below:

First page, left-hand column, inventor's name below "United States Patent [19]" and in item [76] Inventor, "FLAUIANI" should read --FLAVIANI--.

Column 1, line 14, after "useful" insert --device--.

Column 1, line 22, "perview" should read --purview--.

Column 1, line 63, "sprig" should read --spring--.

Column 2, line 47, "flanges 86" should read --flange 85--.

Column 4, line 4, "stablizing" should read --stabilizing--.

UNITED STATES PATENT AND TRADEMARK OFFICE
CERTIFICATE OF CORRECTION

PATENT NO. : 4,542,760              Page 2 of 2
DATED      : September 24, 1985
INVENTOR(S) : Edmond Flaviani It is certified that error appears in the above-identified patent and that said Letters Patent are hereby corrected as shown below:

Column 5, line 24, "latching portion" should read

--latching position--.

Column 6, line 5, "latching portion" should read

--latching position

Column 7, line 5, "latching portion" should read

--latching position--.

Column 8, line 15, "weighed" should read --weighted--.

Signed and Sealed this

Thirty-first Day of December 1985

[SEAL]

Attest:

DONALD J. QUIGG

Attesting Officer            Commissioner of Patents and Trademarks